H. F. HEYCOCK.
PNEUMATIC TIRE.
APPLICATION FILED OCT. 21, 1913.
1,101,930.
Patented June 30, 1914.
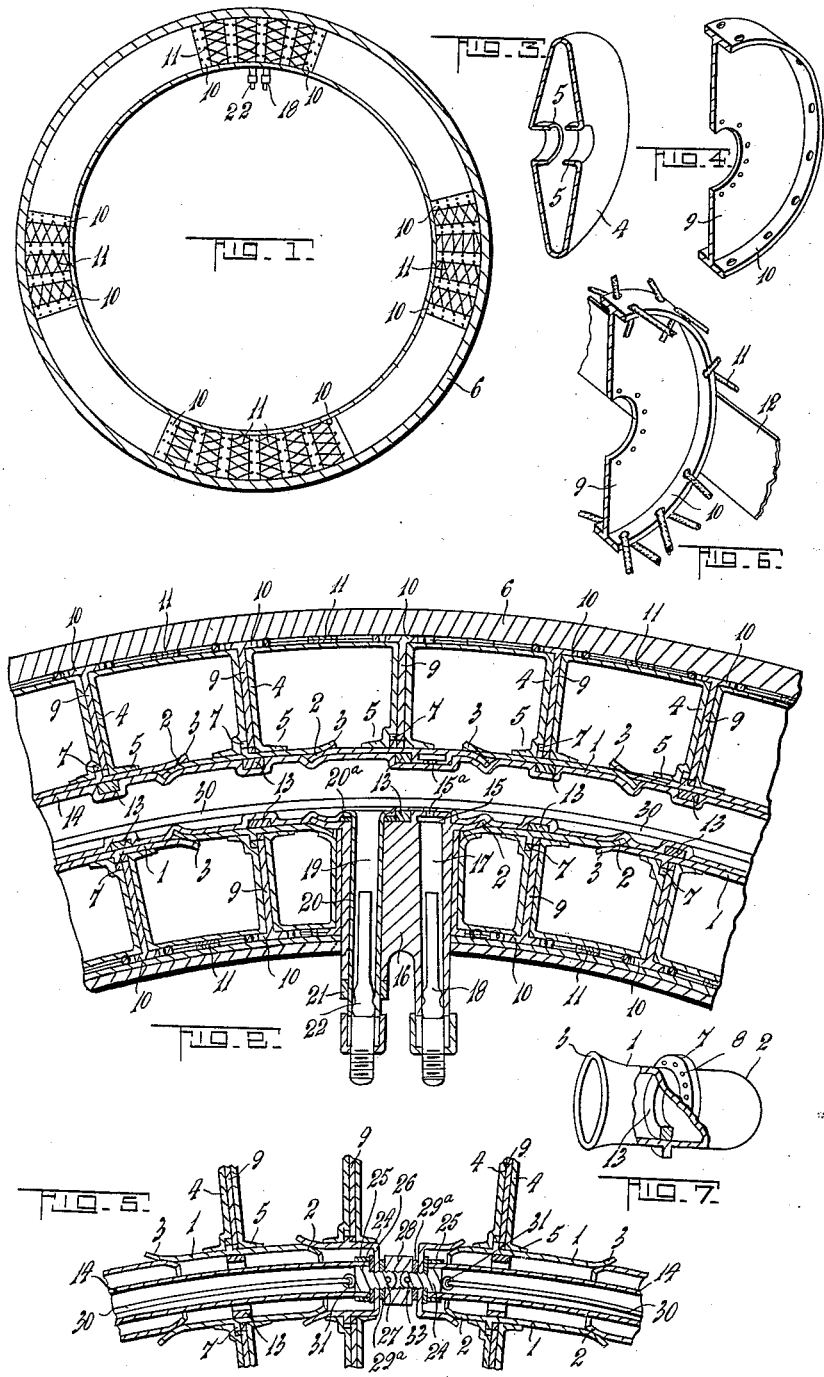
Witnesses:
Charles B. Crompton
Fred Ig. Pohl
H. F. Heycock,
Inventor.
By Croydon Marks
Attorney.

UNITED STATES PATENT OFFICE.

HAROLD FREDERICK HEYCOCK, OF MARTINBOROUGH, NEW ZEALAND.

PNEUMATIC TIRE.

1,101,930.  Specification of Letters Patent.  Patented June 30, 1914.

Application filed October 21, 1913. Serial No. 796,463.

*To all whom it may concern:*

Be it known that I, HAROLD FREDERICK HEYCOCK, a citizen of the Dominion of New Zealand, and residing at Otaraia Road, Martinborough, in the Provincial District of Wellington, in the Dominion of New Zealand, have invented certain new and useful Improvements in Pneumatic Tires, of which the following is a specification.

This invention relates to pneumatic tires and provides improvements in that class of tire wherein a plurality of inflatable rubber cells are employed within a cover.

In the present invention compressed air is supplied to the cells through a series of metal ferrules which extend around the tire, have their ends telescoped together and inclosed by the cells. The compressed air passes between the ends of the ferrules to the cells. An inflatable rubber tube passes through the ferrules, and when inflated forms a lock for preventing compressed air passing from undamaged cells to a punctured cell. An internal collar of india rubber in each ferrule assists in preventing the air from so passing, owing to the close adhesion obtained by the rubber tube being in contact with a rubber collar. Each ferrule is provided with an external flange, and a flanged washer of canvas is attached by sewing to each such external flange. A canvas washer is thus provided upon each side of each cell, and the flanges of the washers are united by lacing. Instead of lacing entirely around the washers, bands of canvas may be sewed, one on each side of the washers, and thus replace a portion of the lacing. By employing ferrules and lacing as above described, the extraction of a punctured cell, without disturbing other cells, is rendered easy.

The invention is illustrated in the accompanying drawing wherein:—

Figure 1, is a diagrammatic section, and Fig. 2, is a section of part of the tire in the same plane as the wheel to which the tire is fitted. Fig. 3, is a perspective cross section of a rubber cell, Fig. 4, is a perspective cross section of a canvas washer. Fig. 5, is a section showing the means for uniting the terminal ferrules, Fig. 6, is a perspective view of a washer with canvas bands, and Fig. 7, is a perspective view of a ferrule.

Referring to the drawing, each ferrule 1 has a contracted end 2, and a flared mouth 3, the ends 2 being adapted to telescope into or enter the mouths 3. The ferrules may be either straight or curved to correspond to the curve of the tire. The rubber cells 4 contained in and corresponding in contour to the cross sectional interior of an ordinary tire cover 6, have inwardly projecting sockets 5 adapted to fit upon the ferrules. The sockets 5 are reduced in thickness at their tips in order to close tightly down upon the sockets when surrounded by compressed air. The sockets may be cemented to the ferrules.

Each ferrule 1 has an external flange 7 having a plurality of holes 8. Canvas washers 9 having flanges 10, are attached to the flanges 7 by sewing. The flanges 10, of washers upon opposite sides of each cell are united by lacing 11, which can be readily loosened when it is necessary to examine the interior of the tire. Instead of using lacing entirely around the circumference of the washers 9, a band 12, of canvas can be used at each side of the tire, with the flanges 10 attached by sewing to the said bands. Each ferrule has an internal collar 13, of india rubber cemented in position and an inflatable rubber tube 14 passes through the ferrules 1 and the collars 13. A double ported nipple 16 is formed integral with or attached to a ferrule 1. A port 17 of the nipple communicates with an annular channel 15 formed around the interior of the ferrule and having holes 15ª through which air can pass to the interior of the ferrule. By means of this channel the passage of air through one or other of its halves is assured. The port 17 is fitted with an ordinary inflater valve 18. Another port 19 receives a tube 20, communicating with the tube 14. A flange 20ª is screwed upon the inner end of the tube 20. The outer end of the tube is screw threaded and fitted with a nut 21, by screwing of which a tight joint is made by that part of the tube between the flange 20ª and the ferrule, so that compressed air cannot escape from the ferrule and the port 19. An inflater valve 22 is fitted within the port 19. The ends of the tube 14, are closed by plugs 24, with which an airtight joint is made by ferrules 25. The terminal ferrules 1 have bottoms 26 through which studs 27, integral with the plugs 24 project. The studs are screwed with left and right hand threads, and a right and left hand nut 28 is adapted to unite the studs together. The plugs 24, are made airtight with the bottoms 26 by washers 29 and nuts 29ª. An inextensible cord 30 passes through the tube 14 and is attached at its ends to eyes 31, fixed to the plugs 24. This cord 30 keeps the ferrules together when they are removed from the tire, and while they are being reinserted therein. The studs have holes 33 to which a cord may be attached for drawing the tube 14 through the ferrules.

In assembling the parts, the washers 9 are sewed to the flanges 7, a cell 4 is placed on the ferrule on each side of the nipple 16 the tube 14 is passed through the said ferrule after the plugs 24 with the cord 30, have been fixed within the said tube. The cord keeps the ferrules from separating as they might otherwise do if they were threaded upon an extensible rubber tube only. The ferrules and cells are added forming a series until the ends of the tube 14 are nearly reached, when a terminal ferrule with a bottom 26 is added and the nut 28 screwed home. The lacing of the washers 9 is then effected, and the whole is placed inside the cover 6 which is then placed upon the rim of the wheel.

Compressed air is first forced through the valve 18 into the interior of the ferrules, and the air finds its way through the joints between the ends of the ferrules into the interior of the cells, which are thereby inflated and fill up the interior of the cover 6. Air is then forced through the port 19 into the tube 14 which expands and closes the joints between the ferrules so that air cannot escape from the ferrules. The internal rubber collars 13 assist the tube 14 in preventing air from escaping from the ferrules.

In the case of a cell being punctured, the air is prevented from escaping from the undamaged cells by the tube 14, and the cells adjacent to the punctured cell fill up to some extent the space left vacant by the punctured cell. The collapse of a cell does not, therefore, render the tire useless but the use thereof can be continued until it is convenient to repair or replace the cell.

What I do claim and desire to secure by Letters Patent of the United States is:—

1. In pneumatic tires, a plurality of rubber cells, a series of ferrules each having an outwardly flared end and a contracted end engaging the outwardly flared end of the adjacent ferrule, said engaging ends permitting the passage of air therebetween and being inclosed by the cells, and an aperture through which air may be forced into said ferrules.

2. In pneumatic tires, a plurality of rubber cells, a series of ferrules having jointed ends to give flexibility, said ends being inclosed by the cells and permitting the passage of air thereinto, an aperture through which air may be forced into said ferrules, a rubber tube passing through said ferrules, and another aperture through which air may be forced into said tube.

3. In pneumatic tires, a plurality of rubber cells, a series of ferrules each having an outwardly flared end and a contracted end engaging the outwardly flared end of the adjacent ferrule, said engaging ends permitting the passage of air therebetween and being inclosed by the cells, an aperture through which air may be forced into said ferrules, a rubber tube passing through said ferrules, and another aperture through which air may be forced into said tube.

4. In pneumatic tires, a plurality of rubber cells, a series of ferrules over the ends of which the cells are mounted, flanged canvas washers between the cells, lacing uniting the flanges of the washers, and an aperture through which air may be forced into said ferrules.

5. In pneumatic tires, a plurality of rubber cells, a series of ferrules over the ends of which the cells are mounted, flanged canvas washers between the cells, canvas bands and lacing uniting the flanges of the washers, and an aperture through which air may be forced into said ferrules.

6. In pneumatic tires, a plurality of rubber cells, a series of ferrules over the ends of which the cells are mounted, a rubber tube passing through said ferrules, internal collars on said ferrules co-acting with said tube to assist in preventing the escape of air from the ferrule and apertures through which air may be forced into said ferrules and into said rubber tube.

In testimony whereof I have signed my name to this specification in the presence of two witnesses.

HAROLD FREDERICK HEYCOCK.

Witnesses:
ERNEST SMITH BALDWIN,
EDNA JOAN COLLEY.

---

Copies of this patent may be obtained for five cents each, by addressing the "Commissioner of Patents, Washington, D. C."